(12) United States Patent
Ngo et al.

(10) Patent No.: US 6,275,347 B1
(45) Date of Patent: Aug. 14, 2001

(54) CURRENT BIAS, CURRENT SENSE PREAMPLIFIER FOR A MAGNETORESISTIVE READER

(75) Inventors: Tuan V. Ngo, Eden Prairie; John D. Leighton, Anoka, both of MN (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/285,397

(22) Filed: Apr. 2, 1999

Related U.S. Application Data
(60) Provisional application No. 60/080,804, filed on Apr. 6, 1998.

(51) Int. Cl.[7] .................................................. G11B 5/09
(52) U.S. Cl. .................................. 360/46; 360/67; 360/66
(58) Field of Search ................................ 360/46, 66, 67; 327/561; 330/62, 252, 260

(56) References Cited

U.S. PATENT DOCUMENTS 5,559,646 * 9/1996 Voorman et al. ..................... 360/67
5,986,840 * 11/1999 Tada et al. ............................. 360/67

* cited by examiner

*Primary Examiner*—David Hudspeth
*Assistant Examiner*—Dau I. Davidson
(74) *Attorney, Agent, or Firm*—Kinney & Lange, P.A.

(57) ABSTRACT

A read system for reading information from a storage medium and for providing an output signal to circuitry external from the read system is disclosed. The read system includes individual channel circuitry, a bias current generator for providing a bias current to the read system, and preamplifier circuitry connected between the bias current generator and the individual channel circuitry. The individual channel circuitry further includes a first and a second magnetoresistive element, a first and a second transistor, and a first and a second switch. The preamplifier circuit further includes a first and a second capacitor connected between a low potential and the first and second switches, respectively, and a third capacitor connected between the first and second capacitors. The preamplifier also includes a first and a second operational amplifier having an output connected to a base of the first transistor and a base of the second transistor. respectively, and a feedback unit connected to the bias current generator.

25 Claims, 5 Drawing Sheets

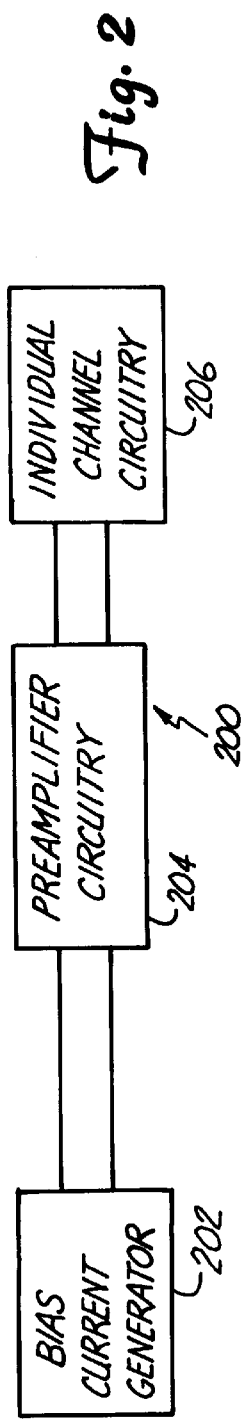
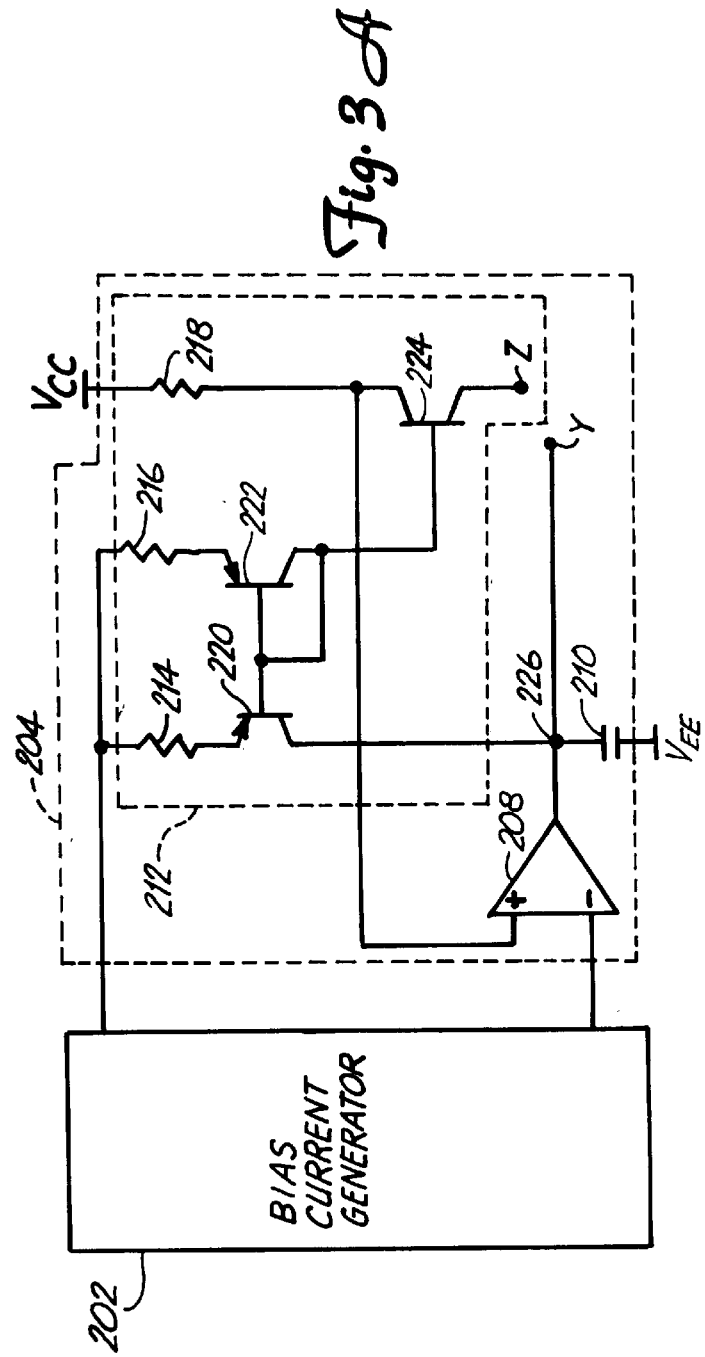

CURRENT BIAS, CURRENT SENSE PREAMPLIFIER FOR A MAGNETORESISTIVE READER

This application is based upon and claims priority from of Provisional Application No. 60/080,804 entitled "Current Bias, Current Sense Preamplifier for Dual Strip MR Head", filed Apr. 6, 1998.

This application also cross-references copending applications entitled "Voltage Bias, Current Sense Preamplifier for a Magnetoresistive Reader" and "Voltage Bias, Current Sense Preamplifier Using No AC-Coupling Capacitors for a Dual Strip Magnetoresistive Reader", filed on even date herewith and assigned to the assignee of the present application.

BACKGROUND OF THE INVENTION

The present invention is a read system for reading information from a storage medium and for providing an output signal to circuitry external from the read system. More particularly, the present invention is a current bias, current sense preamplifier for use with a magnetoresistive reader.

There are presently two types of disc drive systems which write information to and read information from a magnetic storage medium, such as a disc. First, there is an inductive write, inductive read system. Second, there is an inductive write, magnetoresistive (MR) read system. It is the second category in which the present invention lies.

The front end of a disc drive system typically consists of one or more read/write transducers (recording heads), an electronics module (containing the read preamplifier and the write driver), and interconnections between the various heads and the module. The module is placed close to the head to keep the interconnections as short as possible.

The present trend in the data storage industry is to increase aerial density on a magnetic storage medium at constant or even decreasing latencies. This results in magnetic storage mediums having narrower tracks, larger linear densities and higher data rates. While a single-element inductive read/write head has the attraction of simplicity, its applications are becoming outdated due to a non-adequate bandwidth. The bandwidth of a head directly affects the speed with which a head can read information from a magnetic storage medium. The larger the upper pole of the bandwidth, i.e., the point at which the gain of the head begins to roll off, the faster the head can read information from the magnetic storage medium.

In traditional inductive read/write heads, there is a severe conflict in choosing the ideal number of coil "turns" for read and write operations. Narrower track widths require a larger number of turns for reading. This makes the coil inductance increase quadratically. The resonance frequency of the coil inductance and the coil/wiring/electronics capacitance therefore decreases linearly. This reduces the useful data bandwidth rather than increasing it to accommodate a higher data rate. The use of a MR read element does not present this bandwidth restriction. It also allows separate optimization of the MR read element and the inductive write element, making possible write-wide, read-narrow strategies.

A preamplifier that senses a signal out from a MR read element is fundamentally different than a preamplifier which senses a signal from an inductive read sensor. The inductive read sensor has no DC bias across it so that a preamplifier can be directly coupled to it to sense the signal from DC frequencies up to the required upper bandwidth. An MR preamplifier, however, must have the ability to compensate for an inherent DC offset across the sensor which is required to properly bias the MR read element, thereby producing a linear output signal. This bias is on the order of a few hundred milli-volts so that a high gain amplifier that amplifies DC signals cannot be directly connected to the sensor. If such a connection were made, the preamplifier would sense this offset and saturate the amplifier. Therefore, a preamplifier which is connected to an MR read element should pass an AC signal representing information from the magnetic storage medium, but not past the DC biasing signal used to bias the MR read element.

In conjunction with a single strip MR read element, the MR read element, a preamplifier, and a bias current generator are formed in a series arrangement between two supply terminals. Thus, the current supplied by the bias current generator is fed to the MR element so as to bias the MR element. The current supplied to the bias current generator is also fed to the preamplifier circuit. This bias current through the preamplifier circuit results in a certain noise contribution. Prior art preamplifier circuits utilize a capacitor connected between a low voltage potential terminal and a gate of a MOSFET or jFET transistor within the individual channel circuit. Thus, the unwanted DC signal is eliminated during, a read operation. However, the MOSFET or jFET transistor of the preamplifier circuit provides a substantially high level of unwanted noise into the system and prevents accurate reading of the desired signal.

In conjunction with a dual strip magnetoresistive head, which includes two separate magnetoresistive elements, prior art preamplifier circuits utilize a cross-coupling design which cross-couples two capacitors between two separate MOSFET or jFET transistors within the individual channel circuit. Each MOSFET or jFET transistor corresponds to one of the MR elements similar to the single strip MR design. Once again, the two MOSFET or jFET transistors provide a substantially high level of unwanted noise to the system which prevents accurate reading of the desired signal. In addition, multiple capacitors per individual channels were necessary.

Therefore, there is a need for a preamplifier circuit which will block any unwanted DC signals during a read operation and will minimize the amount of unwanted noise within the preamplifier circuitry using a minimal amount of components.

BRIEF SUMMARY OF THE INVENTION

The present invention is a read system for reading information from a storage medium and for providing an output signal to circuitry external from the read system. The present invention utilizes one or more of capacitors and one or more operational amplifiers within the preamplifier circuit to block any unwanted DC signals and to minimize noise during a read operation. The present invention can be used in conjunction with a single or a dual strip MR head, and can be used with a single head or a plurality of heads.

More particulary, the present invention includes individual channel circuitry, a bias current generator for providing a bias current to the read system, and preamplifier circuitry connected between the bias current generator and the individual channel circuitry. The individual channel circuitry further includes at least one magnetoresistive element, at least one transistor, and at least one switch. One or more individual channel circuits can be connected to the preamplifier system creating an efficient design.

In one preferred embodiment which utilizes a dual strip MR head, the preamplifier circuitry includes a first and second capacitor connected between a low potential and the first and second switches, respectively. A third capacitor is connected between the first and second capacitors. The preamplifier includes a first and second operational amplifier having an output connected to a base of the first transistor and connected to a base of a second transistor, respectively, via the first and second switches. The preamplifier circuitry also includes a feedback unit connected between to the bias current generator and the individual channel circuitry.

BRIEF DESCRIPTION OF THE DRAWINGS

FIG. 2 is a block diagram of a read system of the present invention.

FIG. 3A is a circuit diagram showing the preamplifier circuitry of the present invention for use with a single strip magnetoresistive element.

DETAILED DESCRIPTION

The present invention is a current bias, current sense preamplifier for use with one or more magnetoresistive (MR) read heads. The present invention provides a preamplifier which minimizes a DC signal during a read operation and minimizes the amount of unwanted noise within the preamplifier circuitry caused by MOSFET or jFET transistors in prior art designs. The DC signal is initially necessary to properly bias the MR reader such that it will read information from the magnetic storage medium. The present invention can be used in conjunction with a single or a dual strip MR head, and can be used with a single head or a plurality of heads.

Figure 1A:
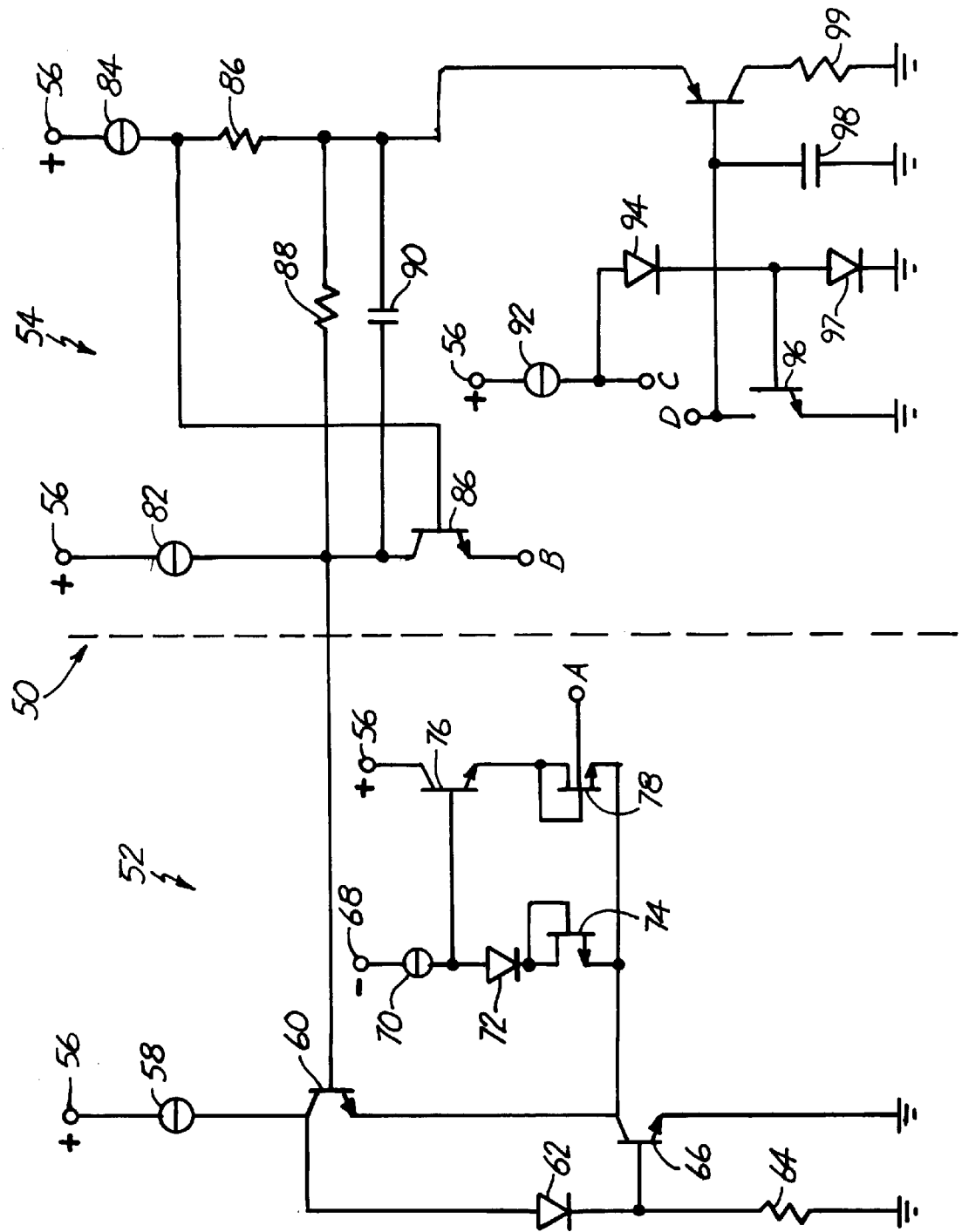
FIG. 1A is a prior art circuit diagram showing a prior art preamplifier circuit.
Figure 1B:
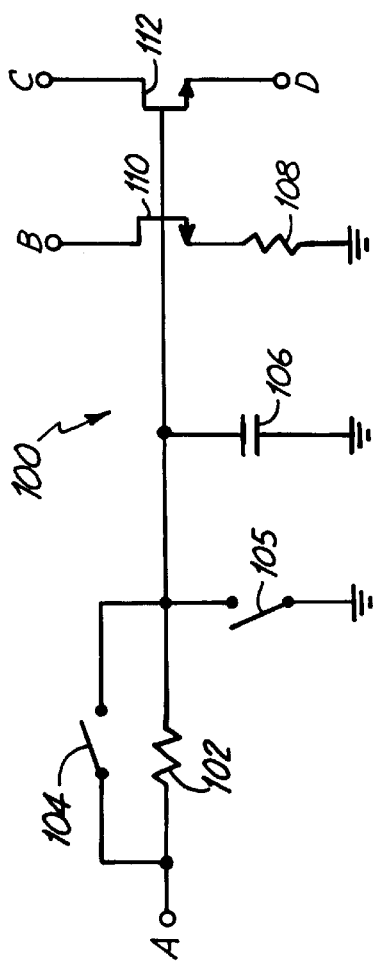
FIG. 1B is a prior art circuit diagram showing an individual channel circuit with use for a single strip magnetoresistive element.

FIGS. 1A and 1B are circuit diagrams showing a prior art preamplifier circuit and a prior art individual channel circuit for use with a single strip MR head, respectively. FIGS. 1A and 1B can be coupled together in order to realize the multiplexed read out of information from a storage system. FIG. 1A shows prior art circuitry 50 which is common to all MR heads and FIG. 1B shows prior art circuitry 100 which is for an individual channel. While circuitry 100 is for an individual channel, multiple channels can be utilized by copying circuitry 100 as necessary.

Prior art circuitry 50 is divided into two portions feedback circuit 52 and preamplifier circuit 54. Feedback circuit 52 includes consist potential 56, current source 58, bi-polar junction transistor 60, diode 62, resistor 64, bi-polar junction transistor 66, consist potential 68, current source 70, diode 72, MOS transistor 74, bi-polar junction transistor 76, and MOS transistor 78.

Preamplifier circuit 54 includes consist potential 56, current source 80, current source 82, bi-polar junction transistor 84, resistors 86 and 88, capacitor 90, current source 92, diode 94, bi-polar junction transistor 96, diode 97, capacitor 98, and resistor 99. Also shown in FIG. 1A are terminals A, B, C, and D. These terminals are the interconnection points between prior art circuitry 50 of FIG. 1A and prior art circuitry 100 of FIG. 1B.

Prior art FIG. 1B shows prior art circuitry 100 which includes terminals A, B, C, and D, MR resistor 102, switches 104 and 105, DC blocking capacitor 106, resistor 108, and MOS transistors 110 and 112.

While the prior art design shown in FIGS. 1A and 1B provided proper feedback and preamplifier circuitry, the use of MOS transistors 110 and 112 within individual channel circuitry 100 provide an unacceptable amount of noise which interferes with the reading of information from the magnetic storage medium by MR resistor 102 during a read operation.

Figure 1C:
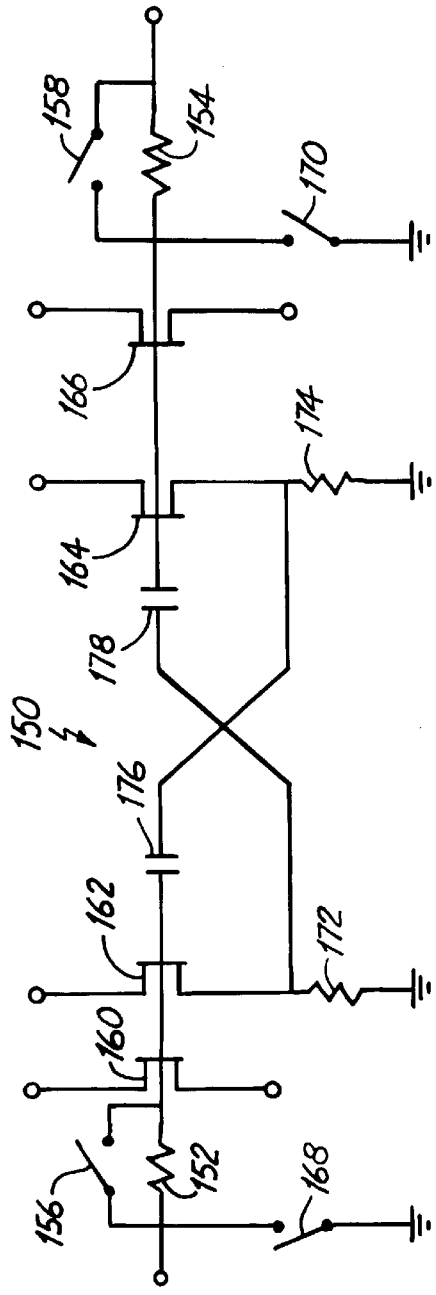
FIG. 1C is a prior art circuit diagram showing an individual channel circuit for use with a dual strip magnetoresistive element.

FIG. 1C is a prior art circuit diagram showing individual channel circuitry 150 for a balanced or dual version MR head. Circuitry 150 includes MR resistors 152 and 154, switches 156 and 158, MOS transistors 160, 162, 164, and 166, switches 168 and 170, resistors 172 and 174, and DC blocking capacitors 176 and 178.

Circuitry 150 shown in FIG. 1C is virtually identical to circuitry 100 of FIG. 1B, except that circuitry 150 of FIG. 1C includes a second MR resistor and related circuitry. Therefore, the right side of FIG. 1C is the mirror image of the left side of FIG. 1C. One distinction between circuitry 150 of FIG. 1C and circuitry 100 of FIG. 1B is that rather than having DC blocking capacitor 106 of FIG. 1B connected to ground, DC blocking capacitors 176 and 178 of FIG. 1C are crossed coupled between the drain and source of MOS transistors 162 and 164. Similar to circuitry 100 shown in FIG. 1B, circuitry 150 of FIG. 1C suffers from unacceptably high noise due to MOS transistors 160, 162, 164, 166, thereby preventing MR resistors 152 and 154 from properly reading information from a magnetic storage medium during a read operation.

FIG. 2 is a block diagram of a read system of the present invention. As shown in FIG. 2, block diagram 200 includes bias current generator 202. preamplifier circuitry 204, and individual channel circuitry 206. The present invention lies within preamplifier 204 and individual channel circuitry 206 and utilizes at least one operational amplifier in a novel arrangement with at least one capacitor. This novel arrangement permits proper biasing of an MR head within individual channel circuitry 206 through use of a DC signal, while minimizing both the DC signal and unwanted noise during a read operation.

FIG. 3A is a circuit diagram showing the preamplifier circuitry of the present invention for use with a single strip MR head. FIG. 3A shows bias current generator 202 and preamplifier circuitry 204. Preamplifier circuitry 204 comprises operational amplifier 208, capacitor 210, and feedback unit 212. Capacitor 210 is used as a DC blocking capacitor in the present invention. Feedback unit 212 further comprises resistors 214, 216, and 218 and bi-polar junction transistors (BJTs) 220, 222, and 224.

Resistors 214 and 216 are inter-connected between bias current generator 202 and the emitters of PNP BJTs 220 and 222, respectively. Resistor 218 is inter-connected between a first voltage potential $V_{CC}$ and the collector of NPN BJT 224. The bases of BJT transistors 220 and 222 are inter-connected to each other and are also connected to the collector of BJT transistor 222 and connected to the base of BJT transistor 224. Capacitor 210 is inter-connected between a second voltage potential $V_{EE}$ and node 226. The output of operational amplifier 208 is also connected to node 226. The negative input terminal of operational amplifier 208 is connected to bias current generator 202, while the positive input terminal of operational amplifier 208 is connected between resistor 218 and the collector of BJT transistor 224. Points Y and Z are inter-connection points between preamplifier circuitry 204 and individual circuitry 206 shown in FIG. 3B.

Figure 3B:
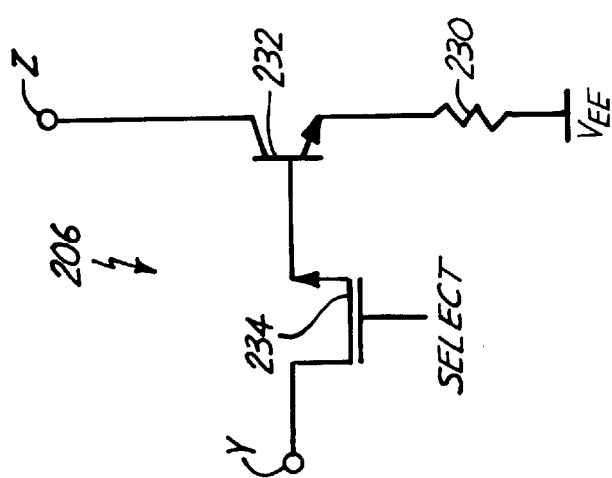
FIG. 3B is a circuit diagram showing an individual read channel for use with a single strip magnetoresistive element.

FIG. 3B shows individual channel circuitry 206 of the present invention comprising a single strip MR head. Individual channel circuitry 206 includes MR resistor 230, NPN BJT 232, and switch 234. In one preferred embodiment, switch 234 is a transistor, such as a Nmos device, which when properly biased is activated. While FIG. 3B shows a single individual channel circuitry, several individual channel circuits can be connected to preamplifier circuitry 204 of FIG. 3A through interconnection points Y and Z. Thus, the circuitry in FIG. 3A can be connected to numerous individual channel circuits, such as individual channel circuitry 206. Switch 234 dictates whether a particular individual circuitry is receiving a power supply from preamplifier circuitry 204 and transmitting a read-signal to preamplifier circuitry 204.

As shown in FIG. 3B, switch 234 is connected between interconnection point Y and the base of BJT 232. The collector of BJT 232 is connected to inter-connection point Z, and MR resistor 230 is connected between the emitter of bi-polar junction transistor 232 and voltage potential $V_{,,}$ In one preferred embodiment, in order to properly design the circuitry of the present invention, capacitor 210 should have a value in the range of 30–250 picoFarrads, resistor 214 should have a value of 5–15 kilo Ohms, resistor 216 has a value in the range of 2–10 kilo Ohms, and resistor 218 has a value in the range of 100–500 Ohms. In addition, voltage potential $V_{CC}$ should have a greater voltage value than $V_{EE}$ to properly bias the circuit.

The present design shown in FIGS. 3A and 3B is a significant improvement over the prior art in that all MOSFET or jFET transistors have been eliminated, thereby eliminating the noise associated with these transistors. Rather than using MOSFET or jFET transistors like those used in the prior art shown in FIGS. 1A–1C, the present invention utilizes BJTs and operational amplifiers. In addition, a capacitor is no longer used in the individual channel circuitry, rather the capacitor is used in the preamplifier circuitry, such as capacitor 210 of FIG. 3A. Therefore, only a single capacitor is necessary for a multiple head assembly, as opposed to a capacitor for each and every individual channel circuit.

Figure 4B:
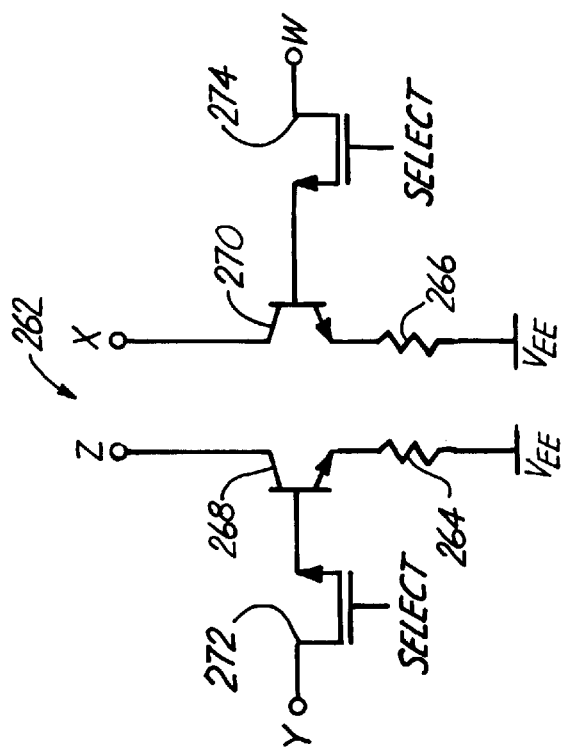
FIG. 4B is a circuit diagram showing the individual channel circuitry for use with a dual strip magnetoresistive element.
Figure 4A:
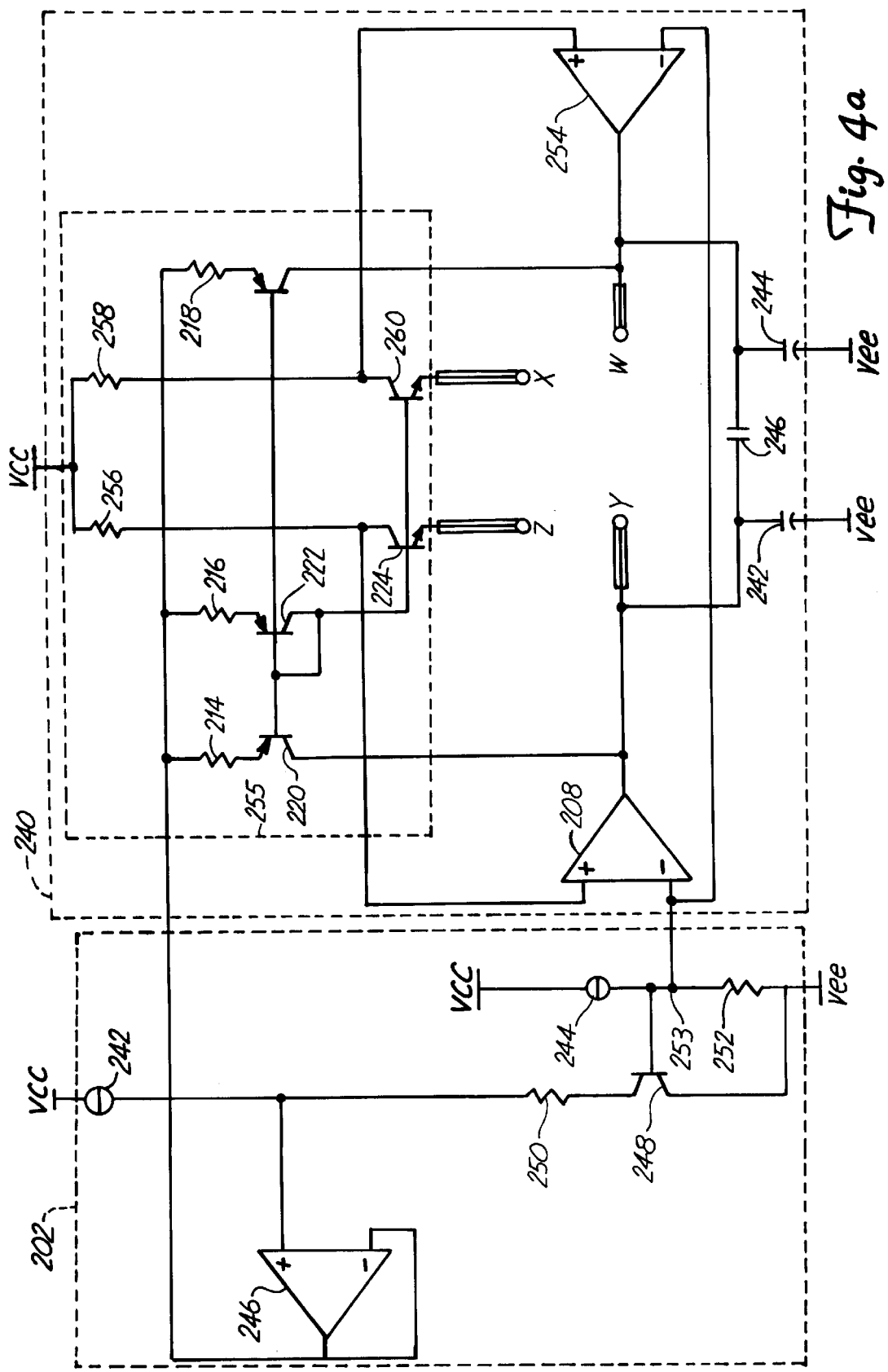
FIG. 4A is a circuit diagram showing the preamplifier circuitry of the present invention for use with a dual strip magnetoresistive element.

FIG. 4A is a circuit diagram showing the preamplifier circuitry of the present invention for use with a dual strip MR element. FIG. 4A includes bias current generator 202 and preamplifier circuitry 240. Bias current generator 202, which is identical to the bias current generator of FIG. 3A and has been labeled as such, includes current sources 242 and 244, operational amplifier 246, bi-polar junction transistor 248, and resistors 250 and 252.

Preamplifier circuitry 240 includes several of the same components which are shown in preamplifier circuitry 204 of FIG. 3A. Thus, like components are numbered accordingly. Preamplifier circuitry 240 includes operational amplifiers 208 and 254 feedback circuitry 255, and capacitors 242, 244, and 246. Feedback circuitry 212 is similar to the feedback circuitry shown in FIG. 3A with the addition of resistors 256 and 258 and NPN BJT 260. Resistors 256 and 258 are connected between voltage potential $V_{CC}$ and the collectors of BJTs 224 and 260, respectively, and the bases of BJTs 224 and 260 are connected to each other.

Bias current generator 202 provides proper biasing of preamplifier circuitry 240 and individual channel circuitry 206 or 260 shown in FIGS. 3B and 4B, respectively. Bias current generator 202 of FIGS. 3A and 4A is one design of a bias current generating circuit which will properly bias preamplifier circuitry 240 and individual channel circuitry 206 or 260. However. it is understood that other bias current generator circuitry may be utilized in conjunction with the present invention.

As shown in FIG. 4A, bias current generator 202 includes current source 242 connected between first potential $V_{CC}$ and a positive input of operational amplifier 246. The negative input of operational amplifier 246 is connected to the output of operational amplifier 246 and connected to preamplifier circuitry 240. Resistor 250 is connected between current source 242 and the emitter of PNP BJT 248. The collector of PNP BJT 248 is connected between second potential $V_{EE}$ and resistor 252. Node 253 is an interconnection point between current source 244, the base of transistor 248, resistor 252, and the negative input of operational amplifier 208 of preamplifier circuitry 240.

FIG. 4B shows individual channel circuitry 262 of the present invention comprising a dual strip MR head. Individual channel circuitry 262 includes MR resistors 264 and 266, NPN BJTs 268 and 270, and switches 272 and 274. The left half of individual channel circuitry 262 is identical to individual circuitry 206 of FIG. 3B, while the right side of FIG. 4B is the mirror image of the left side of the figure.

While FIG. 4B shows a single individual channel circuit, several individual channel circuits can be connected to preamplifier circuitry 240 of FIG. 4A through interconnection points W, X, Y, and Z. Thus, the circuitry in FIG. 4A can be connected to numerous individual channel circuitries such as individual channel circuitry 262. Switches 272 and 274 dictate whether a particular individual circuitry is receiving a power supply from preamplifier circuitry 240 and transmitting a read signal to preamplifier circuitry 240.

As shown in FIG. 4B, switch 270 is connected between interconnection point Y and the base of BJT 268, while switch 274 is connected between inter-connection point W and the base of BJT 270. The collector BJT 268 is connected to inter-connection point Z, while the collector of BJT 270 is connected to inter-connection point X. MR resistor 264 is connected between the emitter of BJT 268 and voltage potential $V_{EE}$, while MR resistor 266 is connected between the emitter of BJT 270 and voltage potential $V_{EE}$.

In one preferred embodiment, in order to properly design the circuitry of the present invention, capacitors 242 and 244 should have a value in the range of 30–100 picoFarrads, while capacitor 246 should have a value in the range of 50–250 picoFarrads. MR resistors 264 and 266 should have a value in the range of 5–100 Ohms. With respect to bias current generator 202, current source 242 should have a value in the range of 50–200 microAmperes while current source 244 should have a value in the range of 2–10 microAmperes. Resistor 250 should have a value of 700–1400 Ohms, while resistor 252 should have a value in the range of 300–900 Ohms.

With respect to preamplifier circuitry 240, resistors 214 and 218 should have value in the range of 5–15 kilo Ohms, while resistor 216 should have value in the range of 2–10 kilo Ohms, while resistors 256 and 258 should have value in the range of 100–500 Ohms. DC blocking capacitors 242 and 244 should have a value in the range of 30–100 picoFarrads, while DC blocking capacitor 246 should have a value in the range 50–250 picoFarrads.

One benefit of the present design is that the present design provides the necessary gain needed to properly read information. In order to determine the gain of preamplifier circuitry 240, some mathematical calculations are necessary. For instance, the gain of preamplifier 240 is equal to the value of resistor 256 divided by the value of MR resistor 264. Likewise, the gain can also be determined by dividing the value of resistor 258 by the value of resistor 266. In one preferred embodiment, the value of resistors 256 and 258 are equal, similarly the value of MR resistors 264 and 266 are equal. Thus, the gain of preamplifier 240 is the same, regardless how it is calculated. While it is understood that there are variations and tolerances within given components, a maximum of 10 percent tolerance will permit a proper read design preamplifier circuit.

The present invention controls the feedback loop within feedback circuitry 255 by tapping the base current of BJT transistors 224 and 260 and then provide a current through a current mirror back to the base of BJTs 268 and 270. This design of the feedback circuitry provides a low gain stage which thereby provides a low corner frequency of preamplifier circuitry 240.

Another advantage of the present invention is that by providing the gain of preamplifier circuitry 240 to operational amplifiers 208 and 254, a better supply rejection circuitry is achieved as compared to prior art systems.

Although the present invention has been described with reference to preferred embodiments, workers skilled in the art will recognize that changes may be made in form and detail without departing from the spirit and scope of the invention.

What is claimed is:

1. A read system for reading information from a storage medium and for providing an output signal to circuitry external from the read system, the system comprising:
   individual channel circuitry comprising:
      a first and a second magnetoresistive element, each element having a first terminal connect to a first potential,
      a first and a second transistor, each transistor having a base a collector, and an emitter, the emitter of the first transistor connected to the second terminal of the first magnetoresistive element and the emitter of the second transistor connected to the second terminal of the second magnetoresistive element;
      a first switch connected to the base of the first transistor; and
      a second switch connected to the base of the second transistor;
   a bias current generator connected to a second potential for providing a bias current to the read system; and
   preamplifier circuitry connected between the bias current generator and the individual channel circuitry, the preamplifier circuitry further comprising:
      a first capacitor connected between the first switch and the first potential;
      a second capacitor connected between the second switch and the first potential;
      a third capacitor connected between the first and second capacitors;
      a first operational amplifier having a positive input, a negative input, and an output, the negative input connected to the bias current generator and the output connected to the base of the first transistor;
      a second operational amplifier having a positive input, a negative input, and an output, the negative input connected to the bias current generator and connected to the negative input of the first operational amplifier, and the output connected to the base of the second transistor; and
      a feedback unit connected to the bias current generator, connected to the positive inputs of the first and second operational amplifiers, and connected to the collectors of the first and second transistors.

2. The read system of claim 1 and further comprising:
   a plurality of individual channel circuitry, each of the plurality of individual channel circuitry comprising:
      a first and a second magnetoresistive element, each element having a first terminal connect to a first potential;
      a first and a second transistor, each transistor having a base, a collector, and an emitter, the emitter of the first transistor connected to the second terminal of the first magnetoresistive element and the emitter of the second transistor connected to the second terminal of the second magnetoresistive element;
      a first switch connected to the base of the First transistor; and
      a second switch connected to the base of the second transistor.

3. The read system of claim 1 wherein the first and second capacitors each have a value in the range of 30 to 100 picoFarrads.

4. The read system of claim 1 wherein the third capacitor has a value in the range of 50 to 250 picoFarrads.

5. The read system of claim 1 wherein the first and second magnetoresistive elements each have a value in the range of 5 to 100 ohms.

6. The read system of claim 1 wherein the bias current generator further comprises:
   a first current source connected to the second potential;
   an operational amplifier having a positive input, a negative input and an output, the negative input connected to the output and connected to the feedback unit, and the positive input connected to the first current source;
   a first resistor connected to the first current source and connected to the positive input of the operational amplifier;
   a third transistor having a base, a collector, and an emitter, the emitter connect to the first resistor, the collector connected to the first potential, and the output connected to a node;
   a second current source connected between the second potential and the node;
   a second resistor connected between the node and the first potential;
   wherein the negative input terminal of the first and second operational amplifiers are connected to the node.

7. The read system of claim 6 wherein the first current source has a value in the range of 50 to 200 microAmperes.

8. The read system of claim 6 wherein the first resistor has a value in the range of 700 to 1400 ohms.

9. The read system of claim 6 wherein the second resistor has a value in the range of 2 to 10 microAmperes.

10. The read system of claim 6 wherein the second resistor has a value in the range of 300 to 900 ohms.

11. The read system of claim 6 wherein the second current source has a value in the range of 2 to 10 microAmperes.

12. The read system of claim 1 wherein the feedback unit further comprises:

a third transistor having a base, a collector, and an emitter, the emitter connect to the collector of the first transistor and the collector connected positive input terminal of the first operational amplifier;

a fourth transistor having a base, a collector, and an emitter, the emitter connected to the collector of the second transistor and the collector connected to the positive input terminal of the second operational amplifier;

a fifth transistor having a base, a collector, and an emitter, the collector connected to the output of the first operational amplifier and connected to the first switch;

a sixth transistor having a base, a collector, and an emitter, the base connected to the collector and connected to the base of the fifth transistor, and the collector connected to the base of the third transistor;

a seventh transistor having a base, a collector, and an emitter, the collector connected to the output of the second operational amplifier and to the second switch and the base connected to the base of the fifth and sixth transistors;

a first resistor connected between the emitter of the fifth transistor and the bias current generator;

a second resistor connected between the emitter of the sixth transistor and the bias current generator;

a third resistor connected between the emitter of the seventh transistor and the bias current generator;

a fourth resistor connected between the second potential and the collector of the third transistor; and a fifth resistor connected between the second potential and the collector of the fourth transistor.

13. The read system of claim 12 wherein the first and third resistors have a value in the range of 5 to 15 kilo Ohms.

14. The read system of claim 12 wherein the second resistor has a value in the range of 2 to 10 kilo Ohms.

15. The read system of claim 12 wherein the fourth and fifth transistors have a value in the range of 100 to 500 Ohms.

16. A preamplifier system connected to a bias current generator for receiving information from a storage medium via a plurality of dual strip readers comprising a first and a second magnetoresistive element, a first and a second transistor, and a first and a second switch, and for providing an output signal to circuitry external from the preamplifier system, the system comprising:

a first capacitor connected between a first potential and a base of the first transistor via the first switch;

a second capacitor connected between the first potential and a base of the second transistor via the second switch;

a third capacitor connected between the first and second capacitors;

a first operational amplifier having a positive input, a negative input, and an output, the negative input connected to the bias current generator and the output connected to the base of the first transistor;

a second operational amplifier having a positive input, a negative input, and an output, the negative input connected to the bias current generator and connected to the negative input of the first operational amplifier, and the output connected to the base of the second transistor; and a feedback unit connected to the bias current generator, connected to the positive inputs of the first and second operational amplifiers, and connected to the collectors of the first and second transistors.

17. The preamplifier system of claim 16 wherein the first and second capacitors each have a value in the range of 30 to 100 picoFarrads.

18. The preamplifier system of claim 16 wherein the third capacitor has a value in the range of 50 to 250 picoFarrads.

19. The preamplifier system of claim 16 wherein the first and second magnetoresistive elements each have a value in the range of 5 to 100 ohms.

20. A preamplifier system for receiving information from a storage medium via a magnetoresistive element and for providing an output signal to circuitry external from the preamplifier system, the system comprising:

a bias current generator connected to a high potential for providing a bias current to the preamplifier system;

a first transistor having a base, a collector, and an emitter, the emitter connected to the magnetoresistive element;

a capacitor connected between the base of the first transistor and a low potential;

an operational amplifier having a positive input, a negative input, the negative input connected to the bias current generator, and the output connected to the base of the first transistor; and a feedback unit connected to the bias current generator, the feedback unit comprising:

a second transistor having a base, a collector, and an emitter, the collector connected to the capacitor;

a third transistor having a base, a collector, and an emitter, the base and collector connected together and connected to the base of the second transistor;

a first resistor connected between the emitter of the second transistor and the bias current generator;

a second resistor connected between the emitter of the third transistor and the bias current generator;

a fourth transistor having a base, a collector, and an emitter, the base connected to the collector of the third transistor, the collector connected to the positive input of the operational amplifier, and the emitter connected to the collector of the first transistor; and a third resistor connected between the collector of the fourth transistor and the high potential.

21. The preamplifier system of claim 20 wherein the capacitor has a value in the range of 30 to 250 picoFarrads.

22. The preamplifier system of claim 20 wherein the first and fourth transistors are NPN bi-polar junction transistors and the second and third transistors are PNP bi-polar junction transistor.

23. A preamplifier system for receiving information from a storage medium via a magnetoresistive element and for providing an output signal to circuitry external from the premplifier system, the system comprising:

a bias current generator for providing a bias current to the preamplifier system;

a first transistor connected to the magnetoresistive element;

a capacitor connected between the first transistor and an output, the first input being connected to the bias current generator, and the output being connected to the first transistor; and a feedback unit comprising:

a first resistor connected between a second fixed potential and the second input of the operational amplifier;

a second resistor connected to the bias current generator;

a third resistor connected to the bias current generator;

a second transistor connected between the first resistor and the first transistor;

a third transistor connected between the second resistor and the capacitor; and a fourth transistor connected between the third resistor and the second transistor, the fourth transistor having a control element and a controlled element connected together and connected to a control element of the third transistor.

24. The preamplifier system of claim 23 wherein the capacitor has a value in the range of 30 to 250 picoFarrads.

25. The preamplifier system of claim 23 wherein the first and second transistors are NPN bi-polar junction transistors and the third and fourth transistors are PNP bi-polar junction transistors.

\* \* \* \* \*

UNITED STATES PATENT AND TRADEMARK OFFICE
CERTIFICATE OF CORRECTION

PATENT NO.    : 6,275,347 B1                                              Page 1 of 1
DATED         : August 14, 2001
INVENTOR(S)   : Tuan V. Ngo et al.

It is certified that error appears in the above-identified patent and that said Letters Patent is hereby corrected as shown below:

Column 3,
Line 8, after "connected" delete "between"
Line 61, delete "consist", insert -- fixed --

Column 4,
Line 32, delete "drain", insert -- gate --

Column 7,
Line 67, after "transistor", insert -- via the first switch --

Column 8,
Line 6, after "transistor", insert -- via the second switch --
Line 46, after "connect", insert -- connected --
Line 47, delete "output" insert -- base --

Column 9,
Line 3, after "connected", insert -- to the --
Line 37, after "transistors", insert -- resistors --
Line 56, after "transistors", insert -- via the first switch --
Line 62, after "transistors", insert -- via the second switch --

Column 10,
Line 22, after "input,", insert -- and an output, --
Line 58, after "and", insert -- a first fixed potential; an operational amplifier having first and second inputs and --

Signed and Sealed this

Twentieth Day of May, 2003

JAMES E. ROGAN
*Director of the United States Patent and Trademark Office*